United States Patent [19]
Maucher

[11] 3,811,544
[45] May 21, 1974

[54] CLUTCH WITH SPRING LOADED OPERATOR FULCRUM

[75] Inventor: Paul Maucher, Neuweier, Germany

[73] Assignee: Luk Lamellen-und Kupplungsbau GmbH, Buhl, Baden, Germany

[22] Filed: Oct. 8, 1971

[21] Appl. No.: 187,868

Related U.S. Application Data
[63] Continuation of Ser. No. 838,611, July 2, 1969, abandoned.

[52] U.S. Cl. ............................ 192/89 B, 192/70.27
[51] Int. Cl. ............................................. F16d 13/44
[58] Field of Search ............ 192/89 B, 70.27, 70.29, 192/70.3

[56] References Cited
UNITED STATES PATENTS

| | | | |
|---|---|---|---|
| 2,359,104 | 9/1944 | Geyer | 192/70.27 |
| 2,813,607 | 11/1957 | Haussermann | 192/89 B |
| 3,323,624 | 6/1967 | Maurice | 192/89 B |

FOREIGN PATENTS OR APPLICATIONS

| | | | |
|---|---|---|---|
| 1,040,240 | 8/1966 | Great Britain | 192/89 B |

*Primary Examiner*—Benjamin W. Wyche
*Attorney, Agent, or Firm*—Herbert L. Lerner

[57] ABSTRACT

Friction clutch includes a flywheel and a cover fastened thereto and having a wall portion spaced therefrom, a pressure plate disposed in the space between the flywheel and the wall portion and connected to the cover, a rotatable entrainment disc mounted in the space, a clutch plate spring disposed between a pair of annular seats and forming therewith and with the cover a unitary structure, the clutch plate spring being swingably mounted, and spring-loaded means for supporting the seat located on one side of the clutch plate spring, the pressure plate being engageable by the clutch plate spring so as to be axially displaced toward the entrainment disc and the flywheel.

10 Claims, 8 Drawing Figures

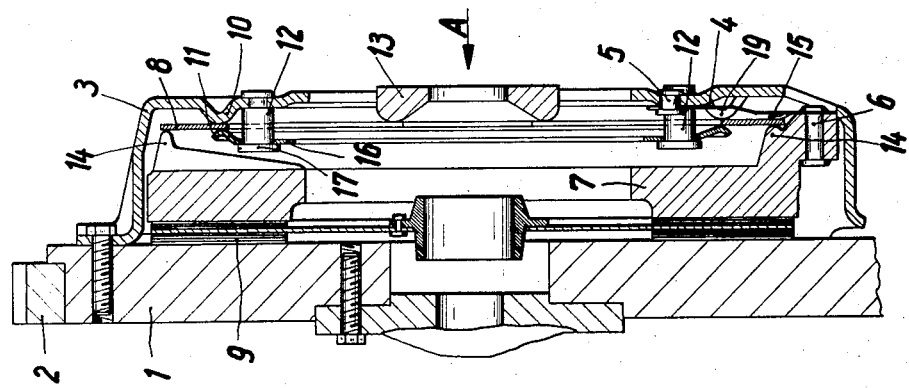
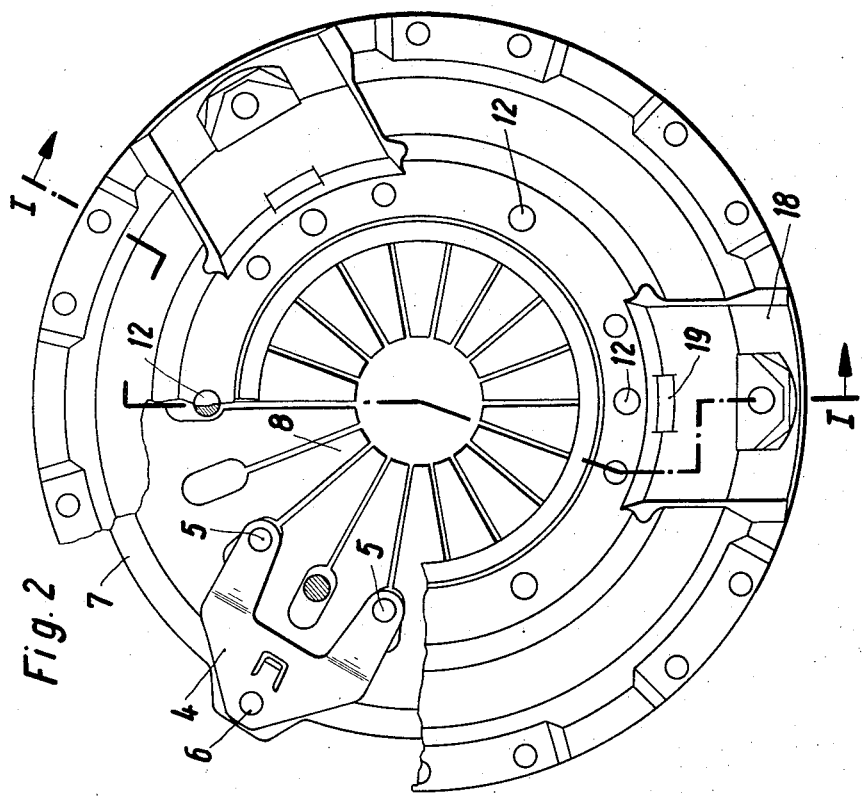

CLUTCH WITH SPRING LOADED OPERATOR FULCRUM

This is a continuation application of my U.S. Pat. application Ser. No. 838,611, filed on July 2, 1969, and now abandoned.

My invention relates to a friction clutch, and more particularly to such clutch having a flywheel preferably in the form of a counterpressure disc, a cover fastened to the flywheel and having a wall portion spaced therefrom, a pressure plate disposed in the space between the flywheel and the wall portion and connected to the cover, a rotatable entrainment disc mountable on a rotatable shaft in the space between the pressure plate and the flywheel, and a clutch plate spring disposed between a pair of annular seats and forming therewith and with a cover a unitary structure, the clutch plate being swingably mounted for axially displacing the pressure plate with respect to the flywheel and the entrainer disc.

In such friction clutches as for example disclosed in German Pat. No. 756,351, wire rings or slide beads are provided as the slide seats for the swingable clutch plate spring at the same level on both sides thereof, the cover being assembled in unitary construction with the clutch plate spring and the slide seats by means of rivets or by pressing with tabs or lugs that have been bent out of the cover.

In order to assure trouble-free operation or swinging of the clutch plate spring when the clutch is being engaged or disengaged, it is necessary that play be provided between the slide seats and the clutch plate spring. Due to this play in the mounting of the clutch plate spring a travel loss is however produced at the pressure plate which is proportional to the order of magnitude of the play itself.

This play increases with increased length of operation, depending upon the wear occuring at the mounting of the clutch plate spring such as for example, at the clutch plate spring itself as well as at the seats, the cover and the pins or bolts, so that the required travel distance for disengaging the clutch increases even further. Another disadvantage of such clutches is that the play necessary for trouble-free functioning of the clutch cannot be accurately controlled due to the required manufacturing tolerances of the component parts thereof as well as to the addition of these tolerances when assembling the clutch, so that the travel loss and the required disengagement distance have no accurately definable magnitudes. In order to obivate the foregoing disadvantages, a clutch has been disclosed in U. S. Pat. No. 2,395,103 wherein a clutch plate spring is swingably mounted between seats provided in an annular arrangement on both sides thereof. In this United States patent, the seat provided on one side of the clutch plate spring, namely on the side facing the pressure plate, is formed of a wire bent in the shape of a ring, whereas the other seat which faces the clutch cover is formed of a circular ring consisting of rubber or another suitable soft material. The rubber support ring is provided with a flat surface lying directly on the side of the clutch plate spring facing the clutch cover in order to retain the clutch plate spring free of play.

It has been found however that such a construction of a clutch has the disadvantage that upon actuating the clutch, , i.e., both during engagement and disengagement thereof, the rubber supporting ring is continuously compressed and relieved of pressure so that a constant large alternating stress is applied thereto. The rubber support ring cannot withstand this stressing over any long period of time especially when the ring is further subjected to soiling such as from oil, dust and the like penetrating into the clutch as well as because of heating effects occuring during the operation of the clutch, so that the clutch becomes unserviceable within a relatively short time because the rubber ring hardens, the elasticity diminishes, and the ring finally breaks so that the clutch plate spring is no longer supported thereby. A further important disadvantage of this clutch is that the rubber support ring abuts the disc or plate-shaped clutch spring with a flat surface. Because of this flat seat surface of the rubber ring, the seat diameter proper and, consequently, the lever arm ratio of the clutch plate spring are not defined, whereby continuous changes in spring force and travel characteristics of the clutch are produced, so that a relatively large additional expenditure of force is required to actuate the clutch spring. Since the force and travel ratios for heavy-duty clutches are moreover utilized to their fullest extent, no increase in the clutch disengaging force, because of the allowable actuating forces at the clutch pedal is possible.

When this heretofore known clutch is engaged, the rubber ring forms the thrust bearing for the clutch plate spring, so that it is compressed toward the clutch cover under the relatively large force exerted by the clutch plate spring when the clutch is engaged. However, this can cause the clutch plate spring to become raised away from the other support ring provided on the other side of the clutch plate spring, so that play or spacing is produced between this rigid seat and the clutch plate spring, resulting in a travel or stroke distance loss at the pressure plate for a given clutch disengaging path.

Furthermore, the points of the clutch spring plate are continuously shifted toward the disengaging bearing so that the required disengaging path becomes increasingly longer. Experience has shown that the very disadvantages sought to be eliminated by the clutch of the aforementioned United States patent are present to an even greater extent in such a clutch and, in fact, such clutches are subject to even further disadvantages.

It is accordingly an object of my invention to provide friction clutch which ensures play-free support of the clutch plate spring during the entire operating period of the clutch, so that the clutch is relatively easily actuable and a constant stroke or travel of the clutch pressure plate is afforded for a given disengagement path thereof.

With the foregoing and other objects in view, I provide, in accordance with my invention, friction clutch comprising a flywheel, a cover fastened to the flywheel and having a wall portion spaced from the flywheel, a pressure plate disposed in the space between the flywheel and the wall portion and connected to the cover, a rotatable entrainment disc mounted in the space between the pressure plate and the flywheel, a clutch plate spring disposed between a pair of annular seats and forming therewith and with the cover a unitary structure, the clutch plate spring being swingably mounted, and spring-loaded means for supporting the seat located on one side of the clutch plate spring, the pressure plate being engageable by the clutch plate spring so as to be axially displaced thereby toward the entrainment disc and the flywheel whereby the flywheel and the entrainment disc are placed in clutching engagement. By providing the spring-loaded supporting means for one of the seats, the clutch plate spring is able to swing relatively easily into the various positions thereof so that even when there is wearing of the seats or of the clutch plate spring proper, no empty space is produced between the seats. The spring-loaded support means also afford the additional advantage that strict adherence to the otherwise necessary narrow limits of manufacturing tolerance for the seats and the fastening elements for the clutch plate spring can be relaxed. Moreover, greater durability of the clutch is attained by the fact that, when wearing of the seats or the clutch plate spring occurs, the seats adjust automatically in accordance with the amount of wear, thereby assuring play-free adjustment of the clutch plate spring and, accordingly, assuring an unvarying travel or stroke distance for the pressure plate over the entire lifespan of the clutch. It is consequently possible to reduce the length of the disengaging path of the clutch to a minimum value since the otherwise necessary path length reserve for accommodating to wear is unnecessary. A further increase in the durability of the clutch plate spring is thereby attained. It is of especial advantage, in accordance with my invention, to provide the spring-loaded support means with a supporting force that is greater than that exerted by the clutch plate spring on the seats.

Further in accordance with my invention, regardless of the layout of the clutch, i.e., as to which of the seats located on either side of the clutch plate spring is supported by the spring-loaded means, and regardless of the arrangement of the clutch plate spring either above the cover, i.e., outside the space between the cover and the flywheel, or below the cover, i.e., inside the space between the cover and the flywheel, according to the various embodiments hereinafter further described, the force exerted by the spring-loaded support means is greater than the disengaging or engaging force exerted by the clutch plate spring on the thus spring-loaded seat.

In accordance with another feature of my invention, the seat subjected to pressure when the clutch is being disengaged is the one receiving the spring-loaded support, i.e., that seat which opposes the disengaging force or the direction thereof. Consequently the supporting force can be kept smaller in proportion to the disengaging-to-engaging force of the clutch than if the other seat not subjected to pressure when the clutch was being disengaged were to receive the spring-loaded support.

According to other features of my invention, the spring-loaded seat may be formed of individual sections, but it has been found to be particularly advantageous to provide the seats with a substantially closed circular construction. The spring-loaded seat proper, in one embodiment of my invention is integral with a springy portion, preferably a plate spring. In another embodiment of the invention, the spring-loaded seat is in the form of a wire ring at least partly gripped by a springy member, preferably a plate spring.

In accordance with additional features of my invention, the clutch plate spring, which either forms the seat proper or which at least partly grips the seat, for example a wire ring, is disposed coaxially to the clutch plate spring and is supported under prestressing through collars formed on the retaining pins or bolts that project through openings in the clutch plate spring and are connected, for example riveted, to the cover.

In accordance with other features of my invention, the substantially closed, circular seat can receive spring-loaded support from a plurality of spring members, such as plate springs, helical springs or the like, that are braced against the collars of the retaining pins or bolts. In such case, a plate-shaped holder portion extending coaxially to the clutch plate spring either is formed with the slide seats itself or at least partly grips the seats, which are for example in the form of the aforementioned wire rings, thereby to ensure travel of the rings in radial direction.

Other features which are considered as characteristic for the invention are set forth in the appended claims.

Although the invention is illustrated and described herein as embodied in friction clutch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 1 and 2 are respectively cross sectional and plan views of one embodiment of the friction clutch according to my invention, the view in FIG. 1 being taken along the line I—I in FIG. 2 in the direction of the arrows, and FIG. 2 being partly broken away to show further details of the friction clutch;

Figure 3:
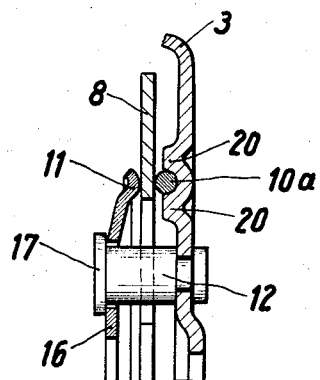
FIGS. 3 to 6 are fragmentary enlarged views of FIG. 1 showing modified unitary structures of the seals, the clutch plate spring and the cover.

Referring now to the drawings and first particularly to FIGS. 1 and 2 thereof, there is shown a friction clutch, according to my invention, having a flywheel 1 in the form of a counter-pressing disc which carries a ring gear 2 at the rim thereof. A cover 3 is secured by screws to the flywheel 1, and a pressure plate 7 is connected through leaf spring elements 4 by means of rivets 5 and 6 to this cover 3. The pressure plate 7 is axially displaceable by a clutch plate spring 8 toward the counterpressure disc 1 and an entrainer disc 9 rotatably secured on a non-illustrated shaft. The clutch plate spring 8 is located between circular seats 10 and 11 formed respectively in the cover 3 and in a ring-shaped plate spring 16 located on opposite sides of the clutch plate spring 8, and is connected thereto in a unitary construction by means of bolts 12. In the position shown in FIG. 1, the clutch is in an engaged condition. To disengage the clutch, the disengaging or shift ring 13, which engages the points of the tongues of the plate spring 8 as shown in FIG. 2, is displaced in the direction of the arrow A by a non-illustrated shift mechanism so that the outer region of the plate spring 8 clamped between the seats 10 and 11 swings toward the cover 3.

The leaf spring or transmission element 4 is formed with a spring tongue 15 in the vicinity of a bearing cam 14 formed on the pressure plate 7. The spring tongue 15 presses on the outer periphery of the plate spring 8 against the bearing cam 14 and, when the clutch is disengaged, effects entrainment of the pressure plate 7 toward the right-hand side of FIG. 1, i.e., into the decoupled or disengaged condition of the friction clutch. The springy support of the clutch plate spring 8 is effected in the embodiment of FIGS. 1 and 2 by the plate spring 16 which is disposed coaxially to the clutch plate spring 8 and which is maintained in prestressed condition through collars or shoulders 17 formed on the bolts or pins 12 which rivet the plate spring 16 to the cover 3.

The seat 10 is formed of a rigid annular bead embossed in the face of the cover 3 and disposed coaxially to the clutch plate spring 8 and directed toward the annular seat 11 formed at the outer periphery of the plate spring 16. The seat 10 formed as an annular bead thus has the same radius as that of the annular seat 11.

As shown further in FIGS. 1 and 2, the cover 3 is as provided in the vicinity of each of the leaf spring elements 4 with a punched-out portion 18, in the vicinity of which the annular seat 10 is interrupted. As shown particularly in FIG. 2, there can be provided in the center region of this punched-out opening 18 a section 19 lying in the circular extension of the seat 10 formed as an annular bead. The section 19 is punched-out in a direction toward the clutch plate spring 8 in accordance with the profile of the annular bead or seat 10 so that the clutch plate spring 8 is also supported in the center region of the punched-out opening 18 on a seat formed by the section 19. For purposes of clarity, the flywheel 1 has been omitted from FIG. 2.

In FIGS. 3 to 8 there are provided fragmentary views of FIG. 1 showing modifications in the unitary assembly of the clutch plate spring 8 and the seats of the plate spring and cover located on both sides of the clutch plate spring. According to the embodiment of FIG. 3, the seat 10a facing the cover 3 is formed from a curved ring, for example of wire, having a circular cross section. The ring 10a can either be formed of a closed, i.e., end-welded ring, or can be open at the ends thereof, and is embedded in a holder device 20 formed with a groove which at least partly grips the ring 10a therein, the ring 10a being thereby fixed by the holder device 20 against movement in the radial direction.

As in the embodiment of FIGS. 1 and 2, the spring-loaded braced seat 11 of FIG. 3 is provided on a plate spring 16 which is pressed against the clutch plate spring 8 by a prestressing force exerted through the collar 17 formed on the bolts or pins 12 which rivet the plate spring 16 to the cover 3.

Figure 4:
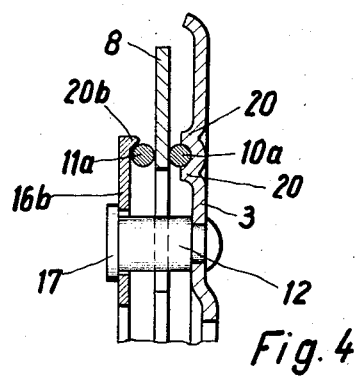

In FIG. 4, the spring-loaded braced seat is formed of either an open or closed wire ring 11a which is held by prestressing between the plate spring 16b and the clutch plate spring 8 again due to the force exerted by the collars 17 of the pins or bolts 12 which rivet the plate spring 16b to the cover 3. The plate spring 16b is provided at its outer periphery with a rim 20b formed as a retaining device which at least partly grips the ring 11a and fixes its radial position. The other elemets shown in FIG. 4 correspond substantially to those shown in FIG. 3.

Figure 5:
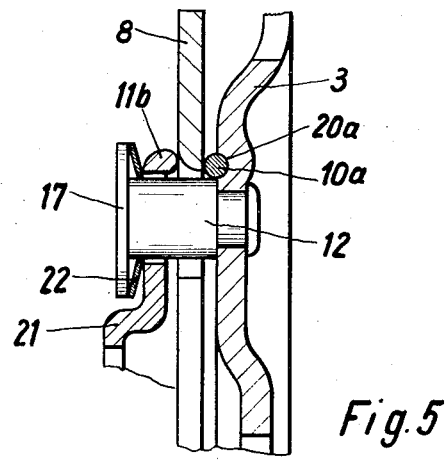
Figure 6:
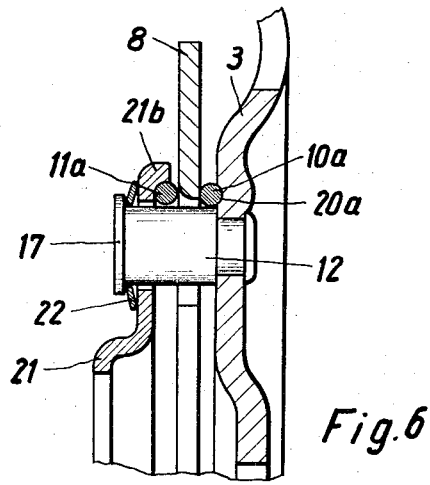
Figure 8:
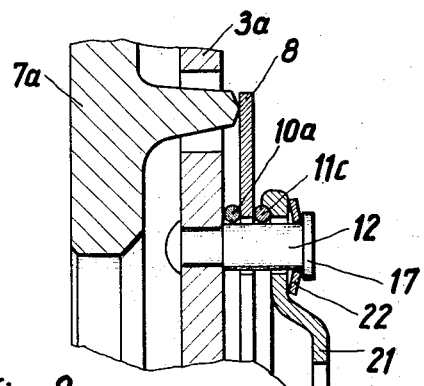
FIG. 8 is a fragmentary view of FIG. 7 showing a modified unitary structure of the seals, the clutch plate spring and the cover.

Whereas, in the embodiments of FIGS. 1 to 4 respectively, only one plate spring 16 or 16b disposed coaxially with the clutch plate spring 8 is provided for spring-loaded support, in the embodiments shown in FIGS. 5, 6 and 8, however, there are provided several spring elements, preferably plate springs 22, which are disposed preferably uniformly over the periphery of a plate shaped member 21 located coaxially to the clutch plate spring 8. These plate springs 22 also abut the collar 17 formed on the pins or bolts 12 which rivet the plate member 21 to the cover 3, the smaller and inner diameter edge thereof being in abutment either with the plate shaped member 21 as in the embodiment of FIG. 5 or with the collar 17 as in the embodiment of FIG. 6. Both in the embodiments of FIG. 5 and FIG. 6, the rigid seat 10a facing the cover 3 is formed of a wire ring which is at least partly received in a retaining groove 20a formed in the cover 3 and is held fast therein against movement in radial direction.

In the embodiment of FIG. 5 the plate shaped member 21 proper is formed at the outer periphery thereof with an annular seat 11b whereas in the embodiment of FIG. 6 the spring-loaded seat is again formed by a preferably open wire ring 11a which is at least partly gripped by a rim 21b formed at the periphery of the plate-shaped portion 21 and thereby, in cooperation with bolts or pins 12, secured against radial displacement.

Figure 7:
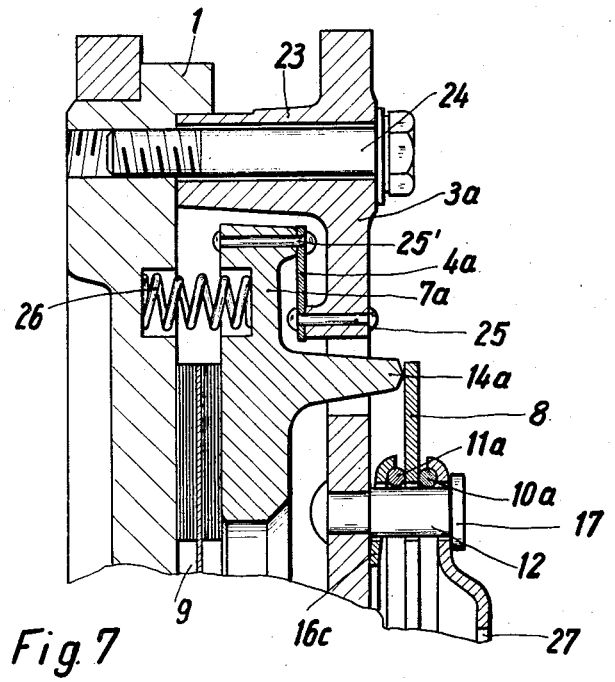
FIG. 7 is an enlarged fragmentary view similar to that of FIG. 1 of another embodiment of my invention.

FIGS. 7 and 8 show a friction coupling of somewhat different construction from that previously illustrated or described, wherein a cover 3a is located between the clutch plate spring 8 and a pressure plate 7a. The cover 3a is connected by means of screws 24 extending through projections 23 to the flywheel 1 constructed in the form of a counterpressure disc. The pressure plate 7a and the cover 3a are secured against mutual relative rotation by leaf spring elements 4a which are fastened at one end to the clutch cover 3a and at the other end to the pressure plate 7a by means of rivets 25 and 25'. The cover 3a, the seats 10a, 11a (FIG. 7) or 11c (FIG. 8) as well as the clutch plate spring 8 are assembled in unitary construction and fastened to one another by rivets 12. The cams 14a on which the clutch leaf spring 8 is superposed, are pressed against the clutch plate spring 8 by springs 26, spaced peripherally from one another and located in suitable recesses formed in the flywheel 1 and the pressure plate 7a, when the clutch is disengaged, and raise the pressure plate 7a from the entrainer disc 9 in accordance with the movement of the clutch leaf spring 8.

In FIG. 7 the springy support of the seat 11a formed of a wire ring is effected by a plate spring 16c which is disposed coaxially to the clutch plate spring 8 and securely fastened by the bolts or pins 12 against movement in the peripheral direction of the clutch. The inner peripheral edge of the plate spring 16c abuts the clutch cover 3a in the embodiment of FIG. 7, and the outer peripheral of the plate spring 16c abuts the annular wire seat 11a. The seat 10a opposing the seat 11a and which is also formed of an open wire ring is at least partly surrounded by a curved rim formed on a plate shaped member 27 which is securely fastened by pins or bolts 12 to the plate spring 16c so that the wire seat 10a is secured against travels in radial direction.

It is especially advantageous in the case of the embodiment shown in FIGS. 1 to 7 if the supporting force exerted on the spring-loaded braced seats is at least as great and preferably greater than the disengaging force exerted by the clutch plate spring on the seats.

Except for the parts illustrated in the modification of FIG. 8, the remaining parts of the clutch corresponds to those shown in FIG. 7. Although the spring-loaded support of the seat 11c in the embodiment of FIG. 8 is effected as in the embodiment FIG. 6 through several plate springs 22 abutting at the inner and outer peripheries thereof respectively with the collar 17 of the pins or bolts 12 and with the plate shaped member 21, it is especially advantageous if the supporting force exerted on the seats 10a and 11c are at least equal or preferably greater than the clutch-engaging force exerted by the clutch plate spring 8 on the spring-loaded braced seats 10a and 11c.

It is evident that the friction clutch of my invention, wherein the seats are provided with a spring-loaded support and wherein the entire force of this springy support is preferably greater than the maximum force exerted by the clutch plate spring on the spring-loaded seats, offers the advantage that the clutch plate spring does not raise itself from the slide rings or seats when the clutch is being disengaged or engaged so that no travel losses occur. A further advantage is that the necessary manufacturing tolerances for the seats and the fastening members need not be maintained within the otherwise required narrow limits. Furthermore the clutch of my invention has the advantage that for any wear occuring to the seat of slide ring locations during the operation of the clutch, always insures a play-free clamping of the clutch plate spring is always afforded due to the automatic adjustment provided by the spring members, whereby a heretofore unattainable durability of the clutch is achieved. Moreover, by means of this springy and consequently play-free support, the production of noise and vibration is minimized.

I claim:

1. Friction clutch comprising a flywheel, a cover fastened to said flywheel and having a wall portion spaced from said flywheel, a pressure plate disposed in the space between said flywheel and said wall portion and connected to said cover, a rotatable entrainment disc mounted in said space between said pressure plate and said flywheel, a clutch plate spring disposed between a pair of annular seats and forming therewith and with said cover a unitary structure, said clutch plate spring being swingably mounted, and spring-loaded means for supporting the seat located on one side of said clutch plate spring, said pressure plate being engageable by said clutch plate spring so as to be axially displaced thereby toward said entrainment disc and said flywheel whereby said flywheel and said entrainment disc are placed in clutching engagement, said clutch plate spring being movable in a direction away from said pressure plate and said flywheel for disengaging the latter from one another, said support means being spring-loaded to exert a greater force at least across the possible path of wear of said plate spring and said seats, on the seat located on said one side of said clutch plate spring than the force with which said clutch plate spring is engageable with said pressure plate, the seat located on said one side of said clutch plate spring being the seat supported by said spring-loaded means and being fixed against displacement in radial direction thereof, said seat located on said one side of said clutch plate spring being retained by a plurality of spacer members located radially inwardly of said last-mentioned seat and form-lockingly secured to said cover, said spacer members extending between said spring-loaded means and said cover and extending through recesses formed in said clutch plate spring.

2. Friction clutch according to claim 1 wherein the seat supported by said spring-loaded means as a substantially closed circular construction.

3. Friction clutch according to claim 1 wherein the seat supported by said spring-loaded support means is integral with said spring-loaded support means.

4. Friction clutch according to claim 1 wherein said spring-loaded support means comprises a plate spring.

5. Friction clutch according to claim 1 wherein said spring-loaded support means comprises a springy member at least partly in gripping engagement with the seat supported thereby.

6. Friction clutch according to claim 5 wherein said springy member comprises a plate spring formed with a plurality of openings and including a plurality of retaining pins projecting through said openings and connected to said cover, said pins being formed with a collar respectively against which said springy member is braced.

7. Friction clutch according to claim 1 wherein said spring-loaded support means comprises a springy member disposed coaxially to said clutch plate spring.

8. Friction clutch according to claim 1 wherein said spring-loaded support means comprises a plurality of plate springs each formed with an opening, and including a plurality of retaining pins respectively projecting through the openings of said plate springs and connected to said cover, said pins being formed with respective collars against which said plate springs are braced.

9. Friction clutch according to claim 1 wherein the seat supported by said spring-loaded support means is integral with a plate-shaped support member disposed coaxially to said clutch plate spring.

10. Friction clutch according to claim 1 wherein the seat supported by said spring-loaded support means is at least partly gripped by a plate-shaped support member disposed coaxially to said clutch plate spring.

* * * * *

UNITED STATES PATENT AND TRADEMARK OFFICE
CERTIFICATE OF CORRECTION

PATENT NO. : 3,811,544
DATED : May 21, 1974
INVENTOR(S) : PAUL MAUCHER

It is certified that error appears in the above-identified patent and that said Letters Patent are hereby corrected as shown below:

Claim 1, line 24, "pressure plate" should read

--seat--.

Signed and Sealed this

Third Day of August 1982

[SEAL]

Attest:

Attesting Officer

GERALD J. MOSSINGHOFF

Commissioner of Patents and Trademarks